Patented May 24, 1938

UNITED STATES PATENT OFFICE 2,118,442

GEOPHYSICAL METHOD OF DETERMINING GEOLOGICAL STRUCTURES

Elton V. McCollum and Lawrence F. Athy, Ponca City, Okla., assignors to Continental Oil Company, Ponca City, Okla., a corporation of Delaware Application June 30, 1934, Serial No. 733,196

2 Claims. (Cl. 181—0.5)

Our invention relates to a geophysical method of determining geological structure and more particularly to a method of determining the angular divergence between two tectonic formations. In the methods of geological explorations now known, one comprises creating vibrations in the earth by detonating explosives or by other means and receiving reflections of the vibrations from subsurface geological formations. The sedimentary portion of the earth's crust consists in general of strata of different material. The elastic coefficients of contiguous layers are quite different. When a vibration, traveling from or near the surface of the earth passes through one layer and enters another, reflection and refraction of a definite part of the vibration will return to the surface of the earth.

It has become of increasing importance in geophysical work to determine the outlines or shapes or contour surfaces of domes, anticlines, and other geological structures. The success which has accompanied geophysical exploration using seismic waves or vibrations has been limited. Good observations may be taken in certain localities. In other localities, it is difficult and, in many cases impossible to obtain accurate results. One underlying cause of error in geophysical explorations has been the extreme variations in the weathered portion of the earth's crust. In the prior art, the outlining of tectonic formations has been accomplished by using the reflected vibrations to compute directly the depth to the layers. This can be done easily when the effective sound velocity in the overburden of the buried layers is known. A number of ways and means of determining the effective velocity are known to the art. In this method, the depth to the different layers must be determined at a number of points on the earth's surface and contour maps of the buried formation are constructed from these depths. This method is known as the correlation method, in which accurate results depend upon the similarity of the seismograms taken at different places on the earth's surface and the ability of the explorer to correlate the seismograms. In this method of "correlation shooting" as it is often termed, the difficulty in the extreme variations, thickness, and physical characteristics of the weathered layer is a source of error. The determination of the thickness of the weathered layer and the time necessary for the passage of sound through it is possible in a number of localities. Accurate determinations, however, are always difficult and, in some localities, impossible. The source of the sound waves and the seismometers or other instruments suitable for the reception of the vibrations may be located below the weathered zone by drilling through it and placing the vibratory source and the receiving instruments in the drilled holes. It will be obvious that this procedure makes seismograph work cumbersome and entails no inconsiderable expense.

Another source of error in correlation shooting arises from the geological fact that tectonic formations are not always continuous throughout a given area which is being explored. This is especially true where structural features such as anticlines or domes exist. A condition of this nature is difficult to detect by the correlation method since it is easy to work from one bed to another when beds abruptly disappear or appear. There are many other difficulties present in correlation shooting.

Another method of using reflected vibrations is what is known as the "dip method". In this method, a plurality of seismometers are arranged at rather closely spaced intervals in a straight line running through the source of sound so that the dip or slope of the beds directly beneath the arrangement may be obtained. Theoretically, only two seismometers need be used spaced from the origin of the vibrations. The time of arrival of the sound reflected from a layer to the instrument furthest away from the origin of the vibrations is normally greater than the time of arrival to that instrument positioned closer to the origin. By a normal case, we mean one in which the buried formations are flat, that is, when they have no dip with respect to the surface of the earth. When the formation is not flat, the difference of the times of arrivals to the two seismometers will be less or greater than normal, according to whether the observation is taken "up dip" or "down dip". Those versed in the art can arrive at the proper dip variations from the data.

In practice, several seismometers are generally set at intermediate points between the two extremely positioned instruments in order to be assured that reflections from the same beds are being observed in the extreme instruments. This method is not susceptible to errors arising from correlations from one "set up" to another in the same degree that the correlation or depth shooting method is, because neighboring geological beds generally exhibit about the same dip or slope. It will be obvious, however, that the thickness of the weathered layer or its physical constituency will vary from one seismometer to another because the depth and constituency of the weathered layer is so extremely variable. Using the dip method, serious errors will arise because the time difference between the instruments will be affected and the computations will lead to erroneous values of dip.

In order to avoid the errors and difficulties of "correlation shooting" and "dip shooting" as commonly practiced we propose a method of finding and defining buried geological structures by a new and novel geophysical method of determining angular divergence or interval change between geological horizons.

Our method is independent of depth determinations or dip determinations as commonly performed and is, as will be shown later, independent of absolute and accurate overall time observations and near surface weathering corrections.

One object of our invention is to provide a novel method of determining the divergence between different geological beds in an accurate and expedient manner.

Another object of our invention is to provide a method of determining the divergence between geological beds in which errors arising from heterogeneity in the weathered portion of the earth's surface are substantially eliminated.

Other and further objects of our invention will appear from the following description.

In the accompanying drawings which form part of the instant specification and are to be read in conjunction therewith and in which like reference numerals are used to indicate like parts in the various views.

Figure 1:
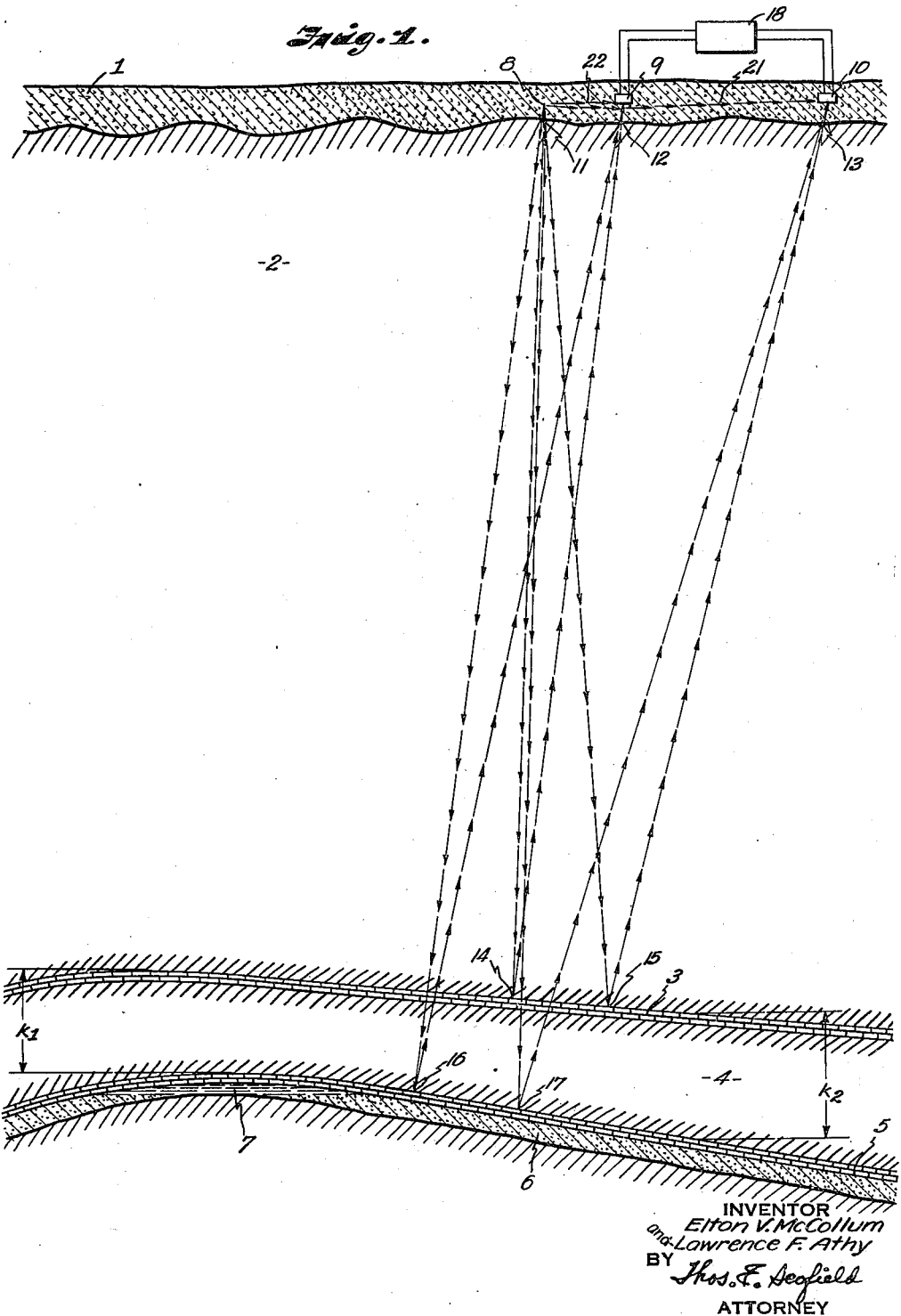
Figure 1 is a diagrammatic, geological cross section through a dome or anticline illustrating a typical arrangement of beds and features of such structures, together with one arrangement of apparatus suitable for carrying out our invention.

Referring now more particularly to the drawings, Figure 1 diagrammatically shows the essential features of a typical geological cross section of an anticline or dome. The weathered layer 1 may be composed of weathered rock, silt, sand and the like, and is variable in thickness and in physical characteristics. Layer 2 consists of unweathered rock of rather definite elastic characteristics. Layer 3 is rock of different physical characteristics from layer 2 so that vibrations traveling through layer 2 will be refracted and reflected from layer 3. Layer 4 is of the same general character as layer 2, while layer 5 is of the same general character as layer 3. Layer 6 may be composed of porous sandstone or other rocks with suitable porosities so that petroleum may be trapped within the layer as at 7.

The search for petroleum has, for a number of years, been to a great extent closely associated with exploration for anticlines or domes as it is under these formations that the petroleum is trapped such as shown in Figure 1. Many more layers are generally present in a geological cross section. The drawing has been simplified in order to serve as an illustration. It will be noted that beds 3 and 5 curve with a convex portion upward. It is a well known geological fact that the deeper beds generally exhibit more closure or steeper dips. This may be seen by comparing beds 3 and 5. Such beds are spoken of as diverging from each other "off the structural feature". Our invention furnishes a method of determining such divergences. A graph with divergence plotted against the relative horizontal position above the structure is variable from a geological standpoint. In geological practice, intervals between beds obtained from well logs or by other methods, are plotted on maps and contoured. In this manner, three dimensional features may be studied with the aid of a map drawn on a plane. The information of greatest interest is the thickening or thinning of the intervals and not the intervals themselves.

In Figure 1, $K_1$ is the interval "on the structure". $K_2$ is the interval "off the structure". It is a geological practice to plot arrows with lengths proportional to the divergence on maps, contouring them directly so that differences in intervals may be obtained.

A vibratory source sends out vibrations in all directions. This may be the result of an oscillator or of an explosion. A portion of the vibratory energy will follow the paths set out in Figure 1. 9 and 10 are seismometers which are adapted to convert the vibrations into electrical manifestations which are recorded in any suitable manner in recorder 18. We prefer to use photographic methods of recordation. It will be observed that a portion of the vibrations will follow path 22 directly to the seismometer 9. Another portion of the vibrations will travel path 21 directly to seismometer 10. This path may be through a portion of the unweathered layer through a part of its course. The paths of the vibrations of more interest travel downwardly through the earth's crust where they encounter the various tectonic formations and are reflected therefrom. These paths travel downwardly through the weathered layer. One path travels from point of origin 8 penetrating the unweathered layer 2 at 11, striking layer 3 at point 14 and being reflected through the layer 2, entering the unweathered layer 1 at 12 and being received by seismometer 9. Another portion of the vibrations from 8 penetrates the weathered layer at 11, encounters layer 3 at 15 and is reflected back through the layer 2 entering the weathered layer 1 at 13, and is received by seismometer 10. Other portions of the vibrations penetrate deeper into the earth. One such path is from the origin 8 through the weathered layer to 11, through layer 2, through layer 3, through layer 4, to layer 5, striking it at point 16 and being reflected through the layers entering the unweathered layer at 12 and being received by seismometer 9. Another path is reflected from point 17 in layer 5.

Figure 3:
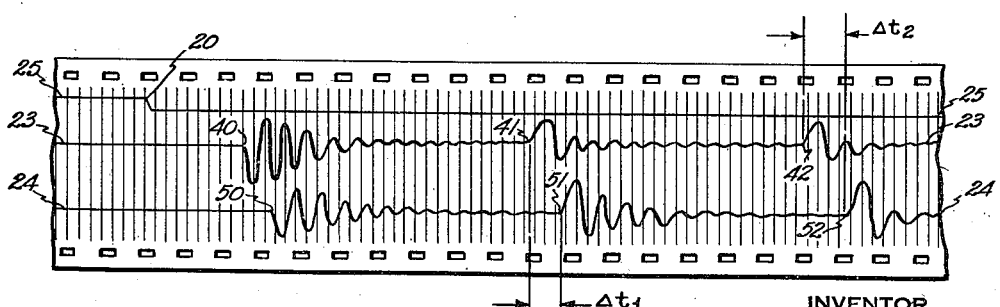
Figure 3 is a view of a portion of a seismogram obtained by the application of our method.

Referring now to Figure 3 in which is shown a seismogram showing the paths just described, a seismogram ordinarily consists of a segment from a roll of photographic film or paper which has been driven along at uniform speed by a rotating drum or other device and on which has been photographed by means of oscillographs or galvanometers time signals and various arrivals of vibrations at the seismometers. The thin parallel lines shown in Figure 3 divide the seismogram into equal time intervals. Such lines may be put upon the record by means of a synchronous motor, driven by a tuning fork or by other well known methods. A common interval is 1/100 second, though it is to be understood that any suitable time interval may be employed. The track 25 upon diagram 3 is the oscillograph trace giving the origin of time of the vibratory waves. The vibrations in this case are generated by the detonation of a quantity of explosive. Point 20 represents the instant of explosion. Trace 23 upon Figure 3 is the oscillograph trace received by seismometer 9. Point 40 represents the instant of arrival of the vibrations traveling along path 22. Point 41 represents the instant of arrival of the vibrations traveling along path 8, 11, 14, 12, 9. Point 42 represents the instant of arrival of the vibrations traveling along path 8, 11, 16, 12, 9. Trace 24 upon the seismogram shown in Figure 3 represents the trace of the oscillograph connected to seismometer 10. Point 50 is the instant of arrival of the portion of the vibrations traveling along the path 21. Point 51 is the instant of arrival of the vibrations traveling along the path 8, 11, 15, 13, 10. Point 52 represents the instant of arrival of the vibrations traveling along the path 8, 11, 17, 13, 10. The time from the instant of origin to the arrival 41 may be obtained by counting the lines between point 20 and point 41. Similarly, the time between the instant of origin and the arrival 42 may be determined by counting the lines between point 20 and point 42. Likewise, the time elapsing from the time of origin to the arrivals 51 and 52 may be determined by counting from point 20. It will be observed that the difference in the arrivals 41 and 51 upon traces 23 and 24 is usually small. This difference can be determined directly from points 41 and 51 and is indicated on Figure 3 as $\Delta t_1$. The time difference between arrivals 42 and 52 is indicated upon Figure 3 as $\Delta t_2$. These time intervals are of great importance in our method, as will be hereinafter more fully pointed out. It will also be noted that these variations are independent of the time of origin at point 20. This is of importance inasmuch as the time of origin is often in error due to differences in blasting caps. Likewise, when radio transmission is being used, a crash of static may interfere with the time of origin and throw out all of the calculations if too great reliance is placed upon this time.

Since it is a known geological fact that the interval between geological formations is less over the crest of a buried anticline or dome than it is off the dome—or in other words, since there is angular divergence of formations in directions radially from the crest of a buried anticline or dome it is possible to determine the position of such a structure by determining merely the direction and not the amount of angular divergence between formations over and around the dome.

This may be done very simply by our method, as follows: In all portions of an area in which there is no angular divergence or in which the geological formations are parallel, the value of $\Delta t_2 - \Delta t_1$, or the time interval from 51 to 52 minus the time interval from 41 to 42 (see Fig. 3) has a constant value on all records obtained when a constant distance is maintained between the shotpoint and the various recording instruments. Also, on any seismograph record obtained within the area when the same distance is maintained between shotpoint and the various recording instruments, if $\Delta t_2 - \Delta t_1$ is greater than the constant value which is normal for the area the direction in which the most distant recorder is positioned from the shotpoint is the direction of angular divergence from the shotpoint. When the observed $\Delta t_2 - \Delta t_1$ is less than normal the profile is positioned in the direction of angular convergence from the shotpoint. By making many such observations over an area and noting the variations from the normal of the values of $\Delta t_2 - \Delta t_1$ it is possible to locate buried anticlines or geological structures by the directions of angular divergence observed at said positions.

It is possible by our method to determine the angular divergence between two or more beds independently of overall time $t$. In Figure 3, arrivals 41 and 51 may be assumed to be reflections from a shallow bed A, and arrivals 42 and 52 from a deep bed B. The normal $\Delta t_1$ for bed A may be established experimentally by those versed in the art; the same is true of $\Delta t_2$ from bed B. Therefore if beds A and B are parallel the value $\Delta t_2 - \Delta t_1$ has a fixed known value. Or if the normal angular divergence over an area is known to be a fixed amount, the value $\Delta t_2 - \Delta t_1$ can also be established. One simple method of determining the normal $\Delta t_2 - \Delta t_1$ for any given pair of reflecting horizons is to average a large number of observed values of $\Delta t_2 - \Delta t_1$ obtained at random over the area being explored. From any record such as in Figure 3 the values $\Delta t_2 - \Delta t_1$ can be measured by counting the time interval 41 to 51 and 42 to 52 usually in thousandths of seconds with no reference to the time or instant of explosion. If $\Delta t_2 - \Delta t_1$ is found to be greater than normal there is excessive divergence present; if $\Delta t_2 - \Delta t_1$ is less than normal there is convergence in the direction in which the profile was shot.

Figure 2:
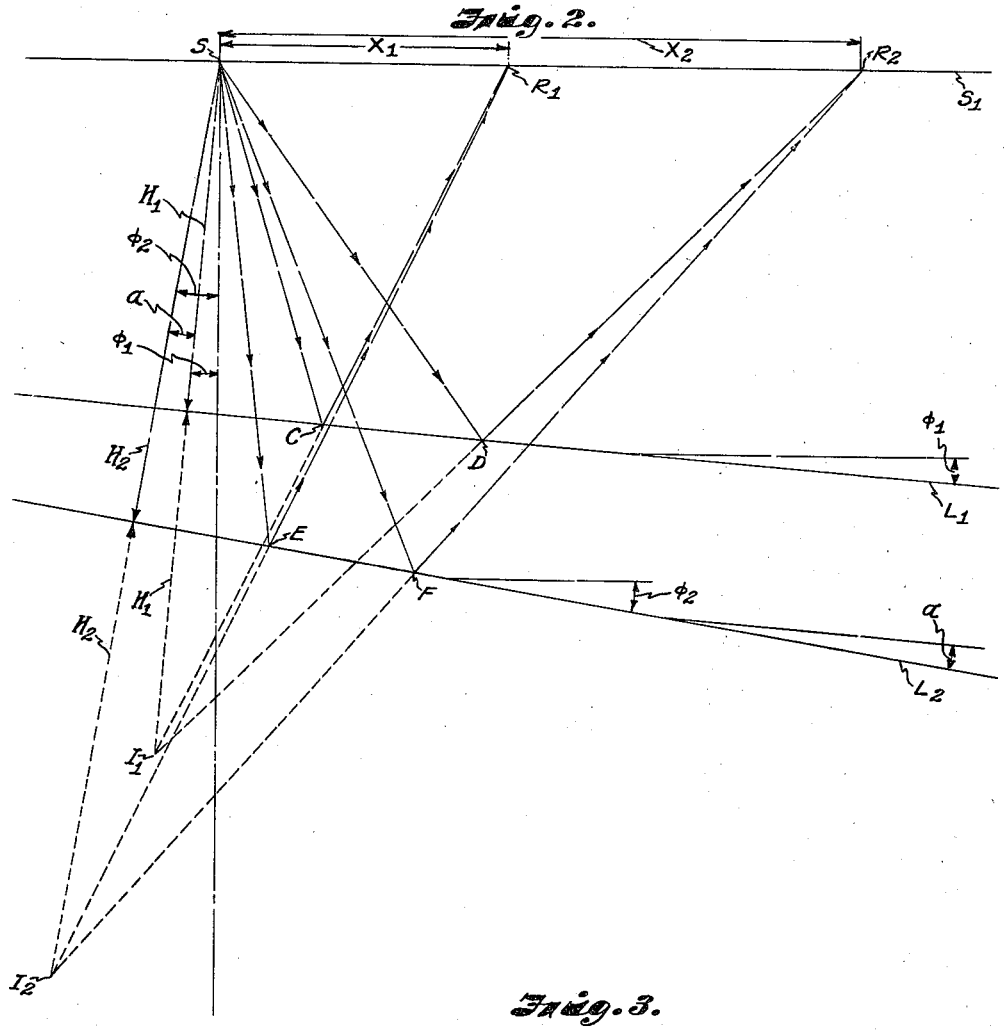
Figure 2 is a diagrammatical view explanatory of our method.

Arriving now to Figure 2, S represents the source of the vibrations. $R_1$ represents the first receiver or seisphone corresponding to 9 in Figure 1. $R_2$ represents the second receiver or seisphone corresponding to 10 in Figure 1. $L_1$ represents layer 3 in Figure 1. $L_2$ represents layer 5 in Figure 1. The angle $\phi_1$ represents the dip of layer $L_1$. The angle $\phi_2$ represents the dip of layer $L_2$. The angle $\alpha$ represents the angle of divergence between layer 1 and layer 2. Point C represents point 14 in Figure 1. It will be observed that the path S, C, $R_1$ is the equivalent of path 8, 11, 14, 12, 9 of Figure 1. The point D represents the point 15 in Figure 1. It will be observed that the path S, D, $R_2$ is the equivalent of path 8, 11, 15, 13, 10 of Figure 1. The point E in Figure 2 is the equivalent of point 16 in Figure 1 so that it will be observed that the path S, E, $R_1$ is the equivalent of path 8, 11, 16, 12, 9 of Figure 1. The point F in Figure 2 is the equivalent of point 17 in Figure 1 so that path S, F, $R_2$ is the equivalent of path 8, 11, 17, 13, 10 of Figure 1.

It is a well known law of optics that, when a reflection occurs, the energy from the source travels the same length of path as though it had come in a straight line from the image of the source in the reflecting plane. The line $S_1$ in Figure 2 represents the surface of the earth. The image of the sound source S in plane $L_1$ is shown at $I_1$. The image of the sound source in plane $L_2$ is shown at $I_2$. It will be readily observed that path S, C, $R_1$ is equal to $I_1$, C, $R_1$ inasmuch as S, C equals C, $I_1$. Similarly $I_1$, D, $R_2$ equals S, D, $R_2$ and S, F, $R_2$ equals $I_2$, F, $R_2$, and S, E, $R_1$ equals $I_2$, E, $R_1$. The perpendicular distance from S to plane $L_1$ is designated as $H_1$. It will be obvious, from inspection, that the distance from the reflected image $I_1$ to plane $L_1$ is also $H_1$. Likewise, the distance from S to plane $L_2$ is designated as $H_2$ which is equal to the distance from the image of the vibratory source, $I_2$ to the plane $L_2$. The distance S, $R_1$ is designated as $X_1$, and the distance S, $R_2$ is designated as $X_2$.

Considering now triangle S, $I_1$, $R_1$, the side X can be measured by surveying. The sides of the triangle can be related by the application of the law of cosines. It will be observed that the included angle $R_1$, S, $I_1$, is equal to $90° + \phi_1$. The equation for triangle S, $I_1$, $R_1$, is, (1) $\qquad V_1^2 t_1^2 = X_1^2 + 4H_1 X_1 \sin \phi_1 + 4H_1^2$ Similarly, triangle S, $I_1$, $R_2$ will give, from the law of cosines, the following equation, (2) $\qquad V_1^2 t_2^2 = X_2^2 + 4H_1^2 + 4H_1 X_2 \sin \phi_1$ Similarly, triangles S, I₃, R₁ and triangles S, I₂, R₂ will give equations, (3) $\quad V_2^2 t_3^2 = X_1^2 + 4H_2^2 + 4H_2 X_1 \sin \phi_2$ (4) $\quad V_2^2 t_4^2 = X_2^2 + 4H_2^2 + 4H_2 X_2 \sin \phi_2$ In the above equations, $t_1$, $t_2$, $t_3$, and $t_4$ are obtained from Figure 3, as pointed out above. The velocity $V_1$ is the effective or average velocity of sound waves in material occurring above bed 3 in Figure 1. The quantity $V_2$ is the effective or average velocity of sound waves in material occurring above bed 5 in Figure 1. The velocities $V_1$ and $V_2$ are obtained by methods well known to the art and which form no part of our invention. It will be obvious from Figure 2 that the angular divergence between beds $L_1$ and $L_2$ is given by the following equation, (5) $\quad \alpha = \phi_2 - \phi_1$ The elimination of $H_1$ between Equations (1) and (2) gives, (6) $\quad V_1^2 t_2^2 - X_2^2 \cos^2 \phi_1)^{\frac{1}{2}} - X_2 \sin \phi_1 = (V_1^2 t_1^2 - X_1^2 \cos^2 \phi_1)^{\frac{1}{2}} - X_1 \sin \phi_1$ $\cos^2 \phi_1$ may be considered equal to unity so that (7) $\quad (X_2 - X_1) \sin \phi_1 = (V_1^2 t_2^2 - X_2^2)^{\frac{1}{2}} - (V_1^2 t_1^2 - X_1^2)^{\frac{1}{2}}$ Equation (7) may be written as (8) $\quad (X_2 - X_1) \sin \phi_1 = V_1 t_2 \left[1 - \frac{X_2^2}{V_1^2 t_2^2}\right]^{\frac{1}{2}} - V_1 t_1 \left[1 - \frac{X_1^2}{V_1^2 t_1^2}\right]^{\frac{1}{2}}$ Expanding the terms within the brackets on the right hand side of Equation (8) into series, and neglecting all but the first two terms of each series leads to (9) $\quad (X_2 - X_1) \sin \phi_1 = V_1 t_2 - V_1 t_1 - \frac{1}{2}\frac{X_2^2}{V_1 t_1} + \frac{1}{2}\frac{X_1^2}{V_1 t_1}$ Referring now to Figure 3, it will be seen that $(t_2 - t_1)$ is $\Delta t_1$ by definition. It can be assumed that $V_1 t_2$ is equal to $V_1 t_1$ in the last two terms on the right hand side of Equation (9) without introducing an appreciable error for practical purposes. Equation (9) then becomes,

(10) $\quad \sin \phi_1 = \frac{V_1 \Delta t_1}{(X_2 - X_1)} - \frac{X_2 + X_1}{2 V_1 t_1}$ Similarly, $H_2$ may be eliminated between Equations (3) and (4) to give

(11) $\quad \sin \phi_2 = \frac{V_2 \Delta t_2}{(X_2 - X_1)} - \frac{X_2 + X_1}{2 V_2 t_3}$ It is well known that a great percentage of geological dips represents small angles. For small angles $\sin \phi_1$ is equivalent to $\phi_1$. For example, the log sin of one degree is equal to 8.24186. The log of $\pi/180$ equals 8.24188. The tabular difference for one minute for one degree is 717. Hence, the use of log $\phi$ for log sin $\phi$ will cause an error in an angle of 60 minutes of $2/717 \times 60$ seconds of ⅛ of one second. Similarly, the error in making this assumption for an angle of 2° would be 1½ seconds. Assuming, therefore, in Equations (10) and (11) that the sine of the angle equals the angle, and substituting Equations (10) and (11) in Equation (5), we obtain,

(12) $\quad \alpha = \frac{V_2 \Delta t_2}{(X_2 - X_1)} - \frac{V_1 \Delta t_1}{(X_2 - X_1)} - \frac{X_2 + X_1}{2 V_2 t_3} + \frac{X_2 + X_1}{2 V_1 t_1}$ It will be observed that, if the weathered layer is different between the two seismometers at 9 and 10, both $\Delta t_2$ and $\Delta t_1$ of Equation (12) will be affected. Since the values $\Delta t_2$ and $\Delta t_1$ occur in terms of opposite sign, the inaccuracy imposed by the weathered layer in former methods will be practically eliminated by our method.

In the description of our invention given above, we have, for the sake of simplicity restricted ourselves to a sample case. It is to be understood, however, that our method can be used in more complicated cases. While we have employed only a single sound source with our seismometers, our invention may be practiced using a plurality of sound sources with one seismometer or a plurality of sound sources with a plurality of seismometers. While we have shown how the divergence between two beds can be determined, it is obvious that our invention may be employed to determine the angles of divergence between more than two beds.

It will be observed that we have accomplished the objects of our invention. We are enabled to determine angular divergence between tectonic formations while avoiding errors introduced by the weathered layer. Our method is particularly valuable where the terrain being surveyed is hilly. Our method is also useful in areas of high dip where several different beds may outcrop between the sources of sound and the several seismometers.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of locating sub-surface tectonic structures, including the steps of generating seismic waves, receiving reflections of said waves at a plurality of spaced points at or near the earth's surface, recording said reflections upon a common record strip, measuring the time differentials between recorded reflections from spaced geological formations, and determining the direction of angular divergence between tectonic layers from said time differentials, whereby errors contributed by near surface layers are substantially avoided.

2. A method of locating sub-surface tectonic structures, including the steps of generating seismic waves, receiving reflections of said waves at a plurality of spaced points at or near the earth's surface, recording said reflections upon a common record strip, measuring the time differentials between recorded reflections from spaced geological formations, and determining the amount of angular divergence between tectonic layers from said time differentials, whereby errors contributed by near surface layers are substantially avoided.

ELTON V. McCOLLUM.
LAWRENCE F. ATHY.